United States Patent
Uota

(10) Patent No.: US 6,292,470 B1
(45) Date of Patent: Sep. 18, 2001

(54) DATA TRANSMISSION SYSTEM AND METHOD UTILIZING HISTORY INFORMATION CORRESPONDING TO CORRECTLY RECEIVED FRAMES

(75) Inventor: Toshihiro Uota, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/996,394

(22) Filed: Dec. 22, 1997

(30) Foreign Application Priority Data

Dec. 25, 1996 (JP) .................................................... 8-344875

(51) Int. Cl.[7] .................................. H04J 3/14; H04L 1/18
(52) U.S. Cl. ........................ 370/252; 370/395; 714/748
(58) Field of Search ................................... 370/252, 394, 370/395; 714/746, 747, 748, 749

(56) References Cited

U.S. PATENT DOCUMENTS

| 5,434,845 | * | 7/1995 | Miller ................................. | 370/252 |
| 5,490,140 | * | 2/1996 | Abensour et al. ................... | 370/352 |
| 5,633,874 | * | 5/1997 | Diachina et al. .................... | 370/329 |
| 5,638,384 | * | 6/1997 | Hayashi et al. ..................... | 714/752 |
| 5,812,527 | * | 9/1998 | Kline et al. ......................... | 370/232 |

FOREIGN PATENT DOCUMENTS

| 570 220 A2 | 11/1993 | (EP) . |
| 4-269031 | 9/1992 | (JP) . |
| 5-145527 | 6/1993 | (JP) . |
| 9-224017 | 8/1997 | (JP) . |

OTHER PUBLICATIONS

"ARQ Scheme Reinforced with Past Acknowledgment Signals", Makoto Nakamura et al., *Electronics and Communications In Japan*, Part 1, vol. 72, No. 11, pp. 93–100, Nov. 1989.

* cited by examiner

Primary Examiner—Seema S. Rao
Assistant Examiner—Saba Tsegaye

(57) ABSTRACT

Throughput of data transmission is improved by efficiently retransmitting a requested frame between two terminals directly connected each other in a packetized data transmission system. Data is transmitted in frames, each of which is constructed of a flag sequence field for delimiting a frame, a forward information field including a number for identifying a frame, a backward information field containing a history of frame-numbers of correctly received frames, an information field including user data of a fixed length and a code for error-detection field for detecting an error of the received frame. With a frame correctly received, a receiving terminal updates a history of correctly received frame-numbers and sets it in a backward information field of a frame to be transmitted to a transmitting terminal. With a frame incorrectly received, history information for a precedent correct frame is set the backward information field of the frame.

12 Claims, 4 Drawing Sheets

DATA TRANSMISSION SYSTEM AND METHOD UTILIZING HISTORY INFORMATION CORRESPONDING TO CORRECTLY RECEIVED FRAMES

BACKGROUND OF THE INVENTION

The present invention relates to a data transmission system using an automatic repeat request (hereinafter is referred to as abbreviation "ARQ") and more particularly to a data transmission system for realizing a procedure of retransmission of error detected frames, which is adapted to a transmission channel such as radio communication with relatively high transmission error-rate.

The recovery of transmission error in data transmission has been conducted by automatic retransmission using ARQ and/or by error-correction technique using error-correction code. ARQ is a method of recovering an error in a data transmission in which any blocks of data found to contain errors at the receiving terminal are automatically requested for repeat transmission from the transmitting terminal. In response to this request, the required blocks are transmitted again from the transmitting terminal to the receiving terminal. A Go-back-N ARQ method and a selective repeat ARQ method are representative.

An example of procedure of the Go-back-N ARQ method is as follows:

In this method, the transmitting terminal transmits data with additions of an error detection code and transmission sequential number, and the receiving terminal performs error checking on every frame of the received data. When any frame containing an error is detected, the recieving terminal informs the transmitting terminal of the sequential number of the frame concerned and requests repeat transmission of the data from the transmitting terminal. The transmitting terminal searches back the sequential number of the frame and repeats transmission of the sequence of data starting from the required frame.

The detailed procedure of retransmission of frames by the Go-back-N ARQ method is as follows:

The transmitting terminal transmits data with error detection codes and transmission sequence numbers N(S). At the receiving terminal, a frame with transmission sequence number N(S)=2 is now found to contain an error. In this case, the receiving terminal transmits a REJ frame with a numeral 2 previously set in a received sequence number N(R) for requesting repeat transmission of the frame having the sequence number 2. Upon receipt of the REJ frame, the transmitting terminal returns to transmission number N(S)=2 and repeats transmission of data in the sequence beginning from the specified sequence number. However, this method has relatively low efficiency and reduces a throughput in data transmission since it requires repeat transmission of the already transmitted correct frames following the requested frame.

The selective repeat ARQ method realizes a higher efficient retransmission. The procedure of this method is as follows:

According to this method, a transmitting terminal transmits data provided with codes for error-detection and transmission sequence numbers. A receiving terminal performs error checking on every frame of the received data any frame containing an error is detected, it informs the transmitting terminal of the sequential number of the frame concerned and requests repeat transmission of the frame from the transmitting terminal. The transmitting terminal repeats transmission of the requested frame only.

The detailed procedure of retransmission of frames is achieved by using the selective repeat ARQ method. The transmitting terminal transmits data with error detecting codes and transmission sequence numbers N(S). At the receiving terminal, a frame with transmission sequence number N(S)=2 is now found to contain an error. In this instance, the receiving terminal transmits a SR frame with a numeral 2 previously set in a received sequence number N(R) for requesting retransmission of the frame having the sequence number 2. Upon receipt of the SR frame, the transmitting terminal transmits the required frame having the sequence number N(S)=2 only and then starts transmission of data in the sequence from the sequence number next to a sequence number already transmitted normally (N(S)=6).

However, the frame (REJ frame or SR frame) for requesting repeat transmission of an error frame may also be incorrectly transmitted over a data transmission path in which transmission error may frequently arise. When the transmitting terminal could not correctly receive the REJ frame (of the Go-back-N AQR method) or the SR frame (of the selective repeat ARQ method) due to the transmission error, the receiving terminal must transmit again the REJ frame or SR frame after a specified time elapsed. This results in further decreasing the data transmission efficiency and reducing the throughput in the data transmission.

SUMMARY OF THE INVENTION

The present invention is, therefore, intended to provide a data transmission system (method) that is free from the above-mentioned problem involved in the conventional methods.

It is an object of the present invention is to provide a data-transmission system (method) for transmitting packetized data between two data terminals directly connected to each other in one-to-one data communication system. The data is transmitted in frames, each of which is constructed of a flag sequence field for delimiting a frame, a forward information field containing a frame-number for identifying a frame, a backward information field including a history of frame numbers of acknowledged (i.e., correctly received) frames, an information field including user data of a fixed length and a code for error-detection field for detecting an error of the received frame.

Another object of the present invention is to provide a data transmission system (method), wherein one of the data terminals makes a check on each received frame by referring to the code for error-detection field. If no error is found, it adds the number of the correctly received frame to the history of the received frame-numbers and sets the updated history information in a backward information field of a frame to be transmitted to the other terminal. If an error is detected therein, the receiving terminal does not update the history of frame-numbers and sets a precedent history information in the backward information field of the frame.

Another object of the present invention is to provide a data transmission system (method), wherein one of the data terminal identifies a frame having been not correctly received by the other terminal from the history information of frame-number included in backward information field of a received frame and again transmits the frame that was not correctly received by the other terminal.

Another object of the present invention is to provide a data transmission system (method), wherein the history information of frame-number included in the backward information field is provided as bits corresponding to respective frame-number. The transmitting party is informed of a number of each frame correctly received by the receiving party, being informed by reversing a corresponding bit.

According to the above-described system (method), the receiving terminal makes a check on a just arrived frame by code for error-detection contained therein. If no error is found in the frame, it updates history of frame-numbers by adding thereto the number of just checked frame and sets the thus updated history information in a backward information field of a frame. If the frame is found to contain an error, it does not add the frame-number to the history information and sets the precedent frame-number instead of the error frame in the background information field of the frame and sends the frame to the transmitting terminal.

According to the above-described system (method) in which each frame has a sequence number expressed by corresponding bit in frame-number history information in a backward information field, the correctly received frame is indicated by an inverted bit corresponding to its frame-number. The incorrectly received (error) frame is indicated by a not-inverted bit and a frame containing an inverted or not-inverted bit in its backward information is transmitted to the transmitting terminal. The transmitting party finds the frame incorrectly received by the receiving party by the not-inverted bit in a bit string in the backward information field and retransmits the required frame to the receiving party.

PREFERRED EMBODIMENTS OF THE INVENTION

Prior to explaining preferred embodiments of the present invention, the prior art data transmission system will be described below as reference for the present invention.

The recovery of transmission error in data transmission has been conducted by automatic retransmission using ARQ and/or by error-correction technique using error-correction code. ARQ is a method of recovering error in data transmission in which any blocks of data found to contain errors at the receiving terminal are automatically requested for repeat transmission from the transmitting terminal and, in response to this request, the required blocks are transmitted again from the transmitting terminal to the receiving terminal. A Go-back-N ARQ method and a selective repeat ARQ method are representative.

An example of procedure of the Go-back-N ARQ method is as follows:

In this method, the transmitting terminal transmits data with additions of error detection code and transmission sequential number and the receiving terminal performs error checking on every frame of the received data. When it is detected that frame contains an error, it informs the transmitting terminal of the sequential number of the frame concerned and requests for repeat transmission of the data from the transmitting terminal. The transmitting terminal searches back the sequential number of the frame and repeats transmission of the sequence of data starting from the required frame.

Figure 1:
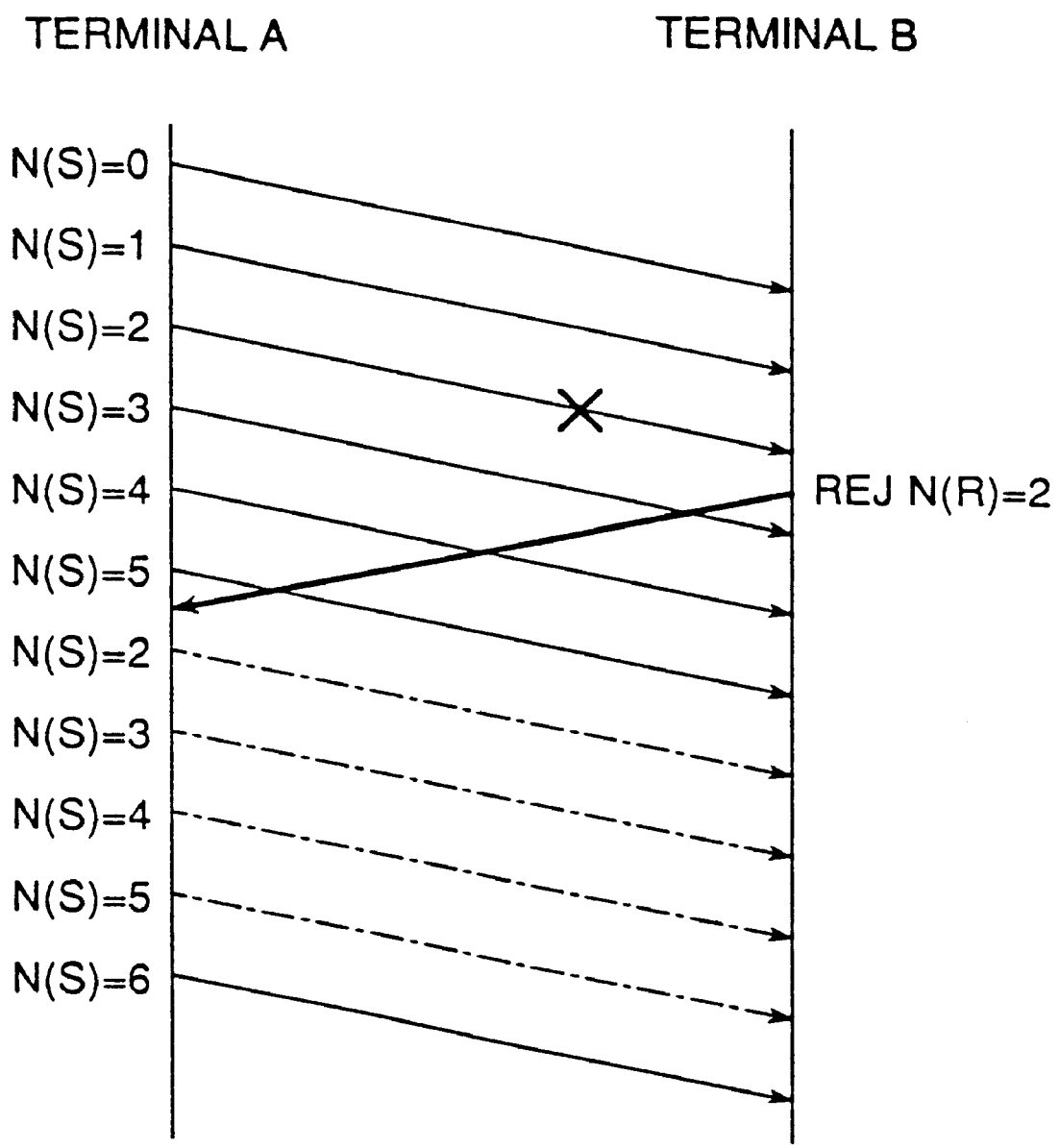
FIG. 1 is a sequence diagram depicting an example of a frame retransmission procedure according to a conventional Go-back-N ARQ (automatic repeat request) method.

FIG. 1 depicts the procedure of retransmission of frames by the Go-back-N ARQ method is as follows:

The transmitting terminal transmits data with error detection codes and transmission sequence numbers N(S). At the receiving terminal, a frame with transmission sequence number N(S)=2 is now found to contain an error. In this case, the receiving terminal transmits a REJ frame with a numeral 2 previously set in a received sequence number N(R) for requesting repeat transmission of the frame having the sequence number 2. Upon receipt of the REJ frame, the transmitting terminal returns to transmission number N(S)=2 and repeats transmission of data in the sequence beginning from the specified sequence number. However, this method has relatively low efficiency and reduces a throughput in data transmission since it requires repeat transmission of the already transmitted correct frames (3 to 5 in the shown case) following the requested frame.

The selective repeat ARQ method realizes a higher efficient retransmission. The procedure of this method is as follows:

According to this method, a transmitting terminal transmits data provided with error detection codes and transmission sequence numbers A receiving terminal performs error checking on every frame of the received data. When detected any frame containing an error is detected, it informs the transmitting terminal of the sequential number of the frame concerned and requests repeat transmission of the frame from the transmitting terminal. The transmitting terminal repeats transmission of the requested frame only.

Figure 2:
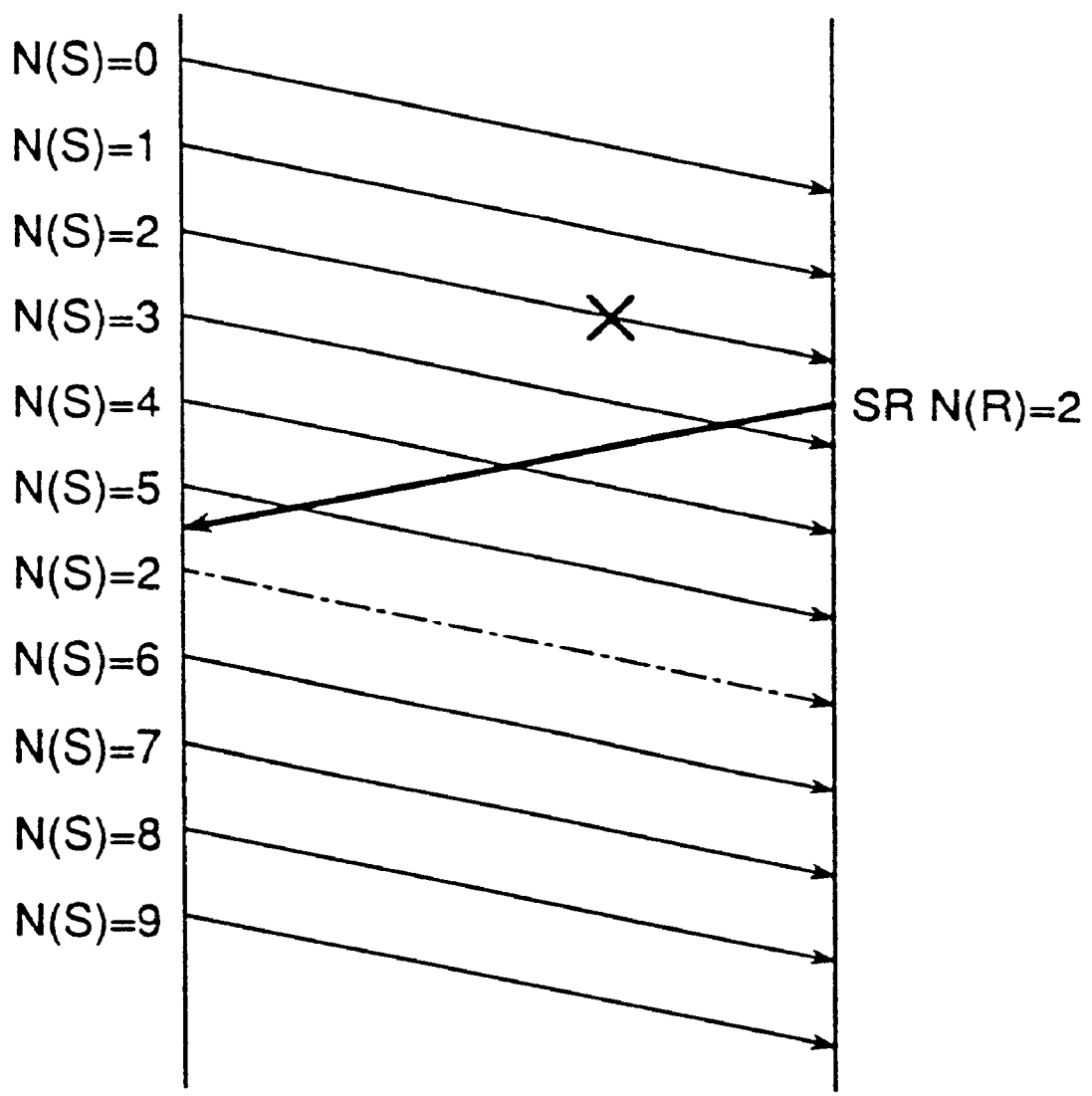
FIG. 2 is a sequence diagram depicting an example of a frame retransmission procedure according to a conventional selective retransmission ARQ method.

FIG. 2 depicts the procedure of retransmission of frames by using the selective repeat ARQ method. The transmitting terminal transmits data with error detecting codes and transmission sequence numbers N(S). At the receiving terminal, a frame with transmission sequence number N(S)=2 is now found to contain an error. In this instance, the receiving terminal transmits a SR frame with a numeral 2 previously set in a received sequence number N(R) for requesting retransmission of the frame having the sequence number 2. Upon receipt of the SR frame, the transmitting terminal transmits the required frame having the sequence number N(S)=2 only and then starts transmission of data in the sequence from the sequence number next to a sequence number already transmitted normally (N(S)=6).

However, the frame (REJ frame or SR frame) for requesting repeat transmission of an error frame may also be incorrectly transmitted over a data transmission path in which transmission error may frequently arise. When the transmitting terminal could not correctly receive the REJ frame (of the Go-back-N AQR method) or the SR frame (of the selective repeat ARQ method) due to the transmission error, the receiving terminal must transmit again the REJ frame or SR frame after a specified time elapsed, resulting in further decreasing the data transmission efficiency and reducing the throughput in the data transmission.

Preferred embodiments of the present invention will be described below:

(Embodiment 1)

Figure 3:
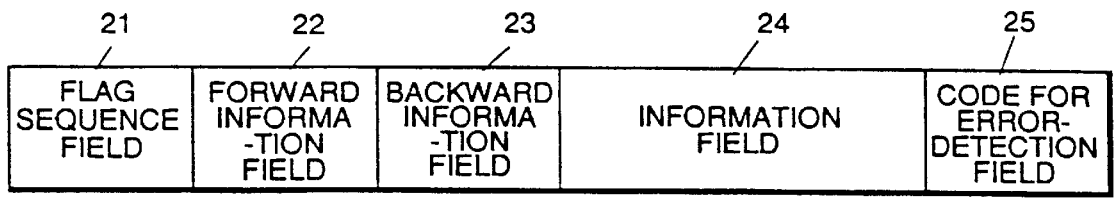
FIG. 3 shows a structure of a frame used for a data transmission system according to the present invention.

FIG. 3 shows a structure of a frame to be used by a data-transmission method of the present invention, which is applied in such a data-transmission system that data is transmitted bidirectionally over a time-slotted time-division-multiplexed transmission channel between two terminals. FIG. 2 shows a first example of a frame retransmission procedure according to the present invention.

In FIG. 3, a flag sequence field 21 is used for setting a flag for delimiting a frame by using a specified bit pattern. A forward information field 22 includes a frame-number for identifying each frame that is a sequential number set by a transmitting terminal before transmitting data. A backward information field 23 includes history information of received frames, wherein a history of the frames correctly received at the receiving terminal is set. In this embodiment, a string of 8 bits corresponding to respective frames is used as the history information of the frame-numbers. An information field 24 is used for setting user's data that is previously divided into fixed-length units. An code for error-detection field 25 is used for setting therein a code for error-detection by which transmission error in the received frame is checked at a receiving terminal. A code for error-detection for cyclic redundancy check (CRC) or the like may be set in this field.

Figure 4:
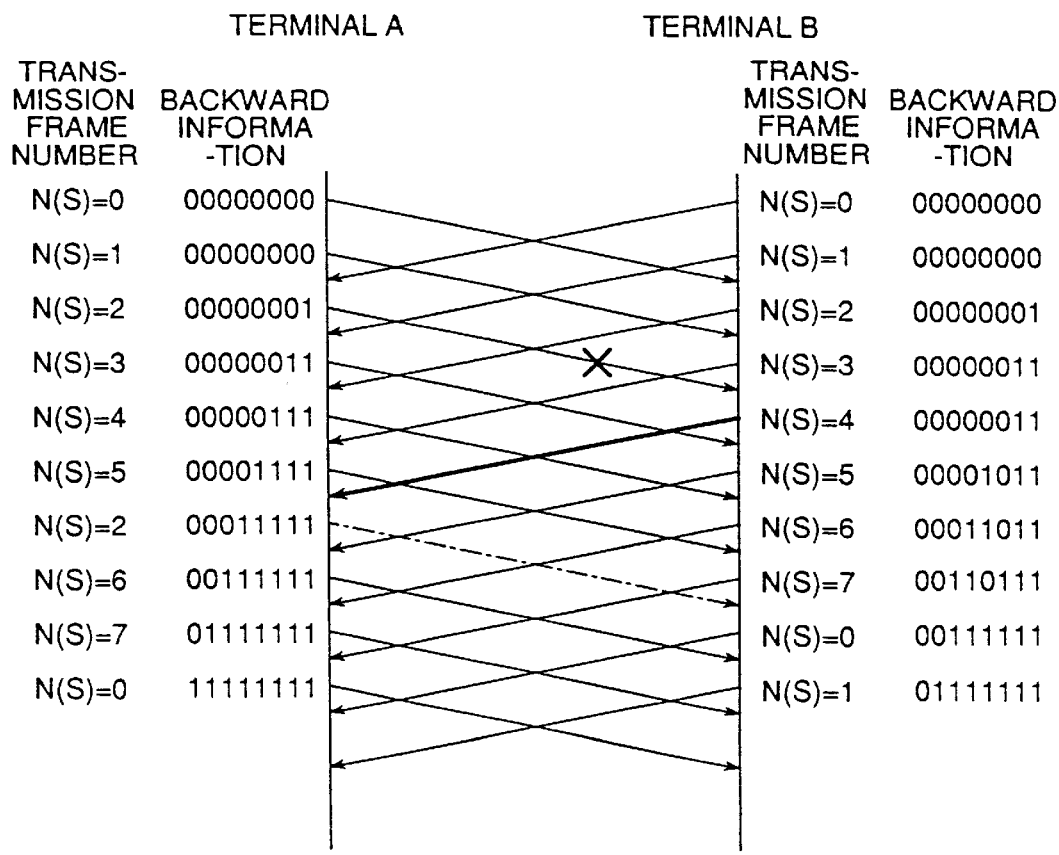
FIG. 4 is a sequence diagram depicting a first example of a frame retransmission procedure according to the present invention.

Referring to FIG. 4, the first exemplified procedure of retransmitting a frame formatted as shown in FIG. 3.

When transmitting, respective terminals A and B divide a, user's data into fixed-length data and add a forward information field 22 including sequential frame-number N(S) to each of the fixed-length data and add a backward information field 23, in which all bits are set first to 0. A flag sequence and a code for error-detection used for detecting transmission error at a receiving terminal are further added to compose a frame to be transmitted. Thus, prepared frames are transmitted subsequently from a transmitting terminal to a receiving terminal.

At one terminal, receiving frames from the other terminal to be communicated, an error check is made on each of the frames by using code for error-detection. For each correctly received frame, a corresponding frame-numbering bit in a bit string is inverted and set in a backward information field 23 of a frame to be transmitted in return to the other terminal to be communicated. In practice, a frame set first with "00000000" in its backward information field 23 is changed, when correctly receiving a frame N(S)=0 from the other terminal to be communicated, to be set next with "00000001" in a backward information field 23 of a frame to be transmitted. Then, the frame set in its backward information field 23 is changed, when correctly receiving a subsequent frame N(S)=1 from the other terminal to be communicated, to be set with a bit string "00000011".

When having found any frame with an error from the other terminal to be communicated, the receiving terminal does not conduct updating the bit string and sets the preceding bit-string in the backward information field 23 of a frame to be transmitted. Thus, the receiving terminal requires retransmission of the incorrectly received frame by sending the frame with a not inverted bit string in the backward information field 23.

The transmitting terminal compares the received frame with the just preceding frame by bit strings of their backward information 23 and judges whether the frame-numbering bits are inverted in the order of the transmitted frame-numbers.

In this embodiment (FIG. 4), the terminal A received twice the same backward information "00000011" and therefore judges that the frame N(S)=2 contained an error and could not correctly be received by the terminal B. Accordingly, the terminal A retransmits the frame N(S)=2 following the frame N(S)=5 and then restarts sequential transmission of frames from N(S)=6.

(Embodiment 2)

Figure 5:
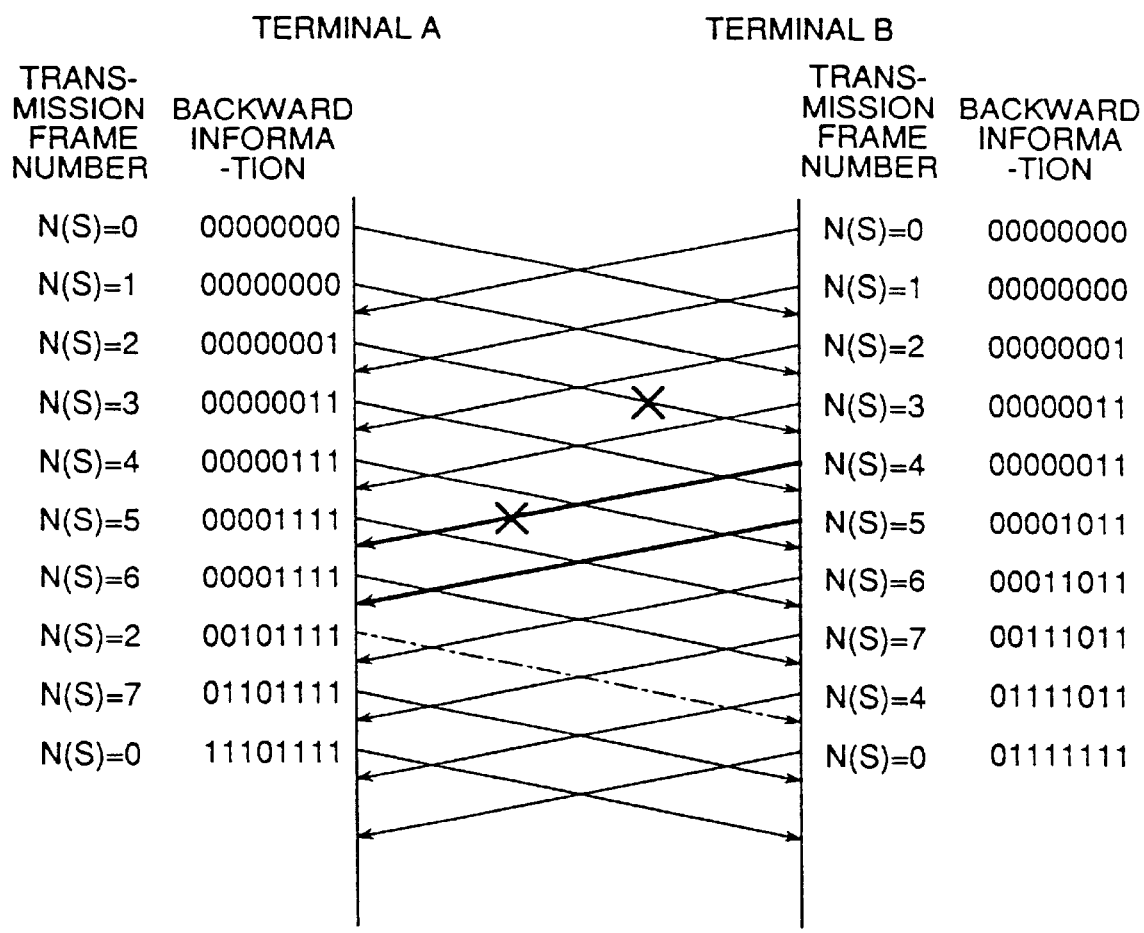
FIG. 5 is a sequence diagram depicting a second example of a frame retransmission procedure according to the present invention.

FIG. 5 depicts a second example of a frame retransmission procedure according to the present invention.

Referring to FIG. 5, the second aspect of the procedure of retransmitting frames is described as follows:

This aspect of the procedure is provided for the case that, in the first aspect of the frame-retransmission procedure, the terminal B detected an error frame and sent a response frame with a not-updated precedent bit string "00000011" in its backward information field 23. However, this request frame could not correctly be received by the terminal A owing to an error arisen in the backward information field 23.

In this case, the terminal A can not know the incorrect receipt of the concerned frame by the terminal B and therefore sends a frame N(S)=6 following a frame N(S)=5 to the terminal B. After this, the terminal A receives a response frame with a bit string "00001011" set in the backward information field from the terminal B, by which bit string pattern the terminal A can recognize that the frame N(S)=2 could not correctly be received by the terminal B. The terminal A transmits again the frame N(S)=2 following the frame N(S)=6 and then restarts the sequential transmission of frames from a frame N(S)=7.

According to the present invention, one communication terminal always informs the other communication terminal of a historical information of each received frame. Therefore, even if a retransmission request (response frame) could not correctly be received by the terminal due to transmission error in a transmission path, the terminal can inform the retransmission request by a subsequent frame. This is effective to reduce a time necessary for restarting the normal sequential transmission of frames.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transmission system for transmitting packetized data between connected data terminals, wherein frames of data are transmittable in packets, each including a flag sequence field for delimiting a frame, a forward information field containing a frame-number for identifying a frame, a backward information field containing a history of received frame-numbers of correctly received frames, an information field containing data and an error-detection field for detecting an error of the received frame, and wherein one of the data terminals checks the error-detection field of a received frame and, if no error is detected, adds the number of the correctly received frame to the history of the received frame-numbers and sets the updated history information in the backward information field of a frame to be transmitted to the other terminal or, if an error is detected, does not add the number of the error frame to the history of frame-numbers and sets precedent history information in the backward information field of the frame to be transmitted to the other terminal.

2. A data transmission system as defined in claim 1, wherein one of the data terminals identifies a frame not correctly received by the other terminal from the history information included in the backward information field of a received frame and retransmits the frame that was not correctly received by the other terminal.

3. A data transmission system as defined in claim 1, wherein the history information included in the backward information field includes bits corresponding to respective frames, and a bit corresponding to a number of a correctly received frame is inverted to inform the other terminal of the correctly received frame.

4. A method comprising:

transmitting a frame of packetized data from a first terminal to a second terminal;

receiving a transmission at the first terminal in response to the second terminal receiving the transmission, wherein the transmission includes updated history information indicative of the received frame added to previous correctly received frames of packetized data if the second terminal received a correct transmitted frame of packetized data, and includes non-updated history information indicative of previous correctly received frames if the second terminal did not receive a correct transmitted frame of packetized data.

5. The method of claim 4, wherein updated history information includes a frame number of a received correct frame added to existing history information.

6. The method of claim 4, further comprising:

comparing history information of the received transmission to history information of a preceding received transmission; and retransmitting the previously transmitted frame of packetized data upon the history information of the received transmission being identical to the history information of the preceding received transmission.

7. The method of claim 4, further comprising:

examining history information of the received transmission; and retransmitting a previously transmitted frame of packetized data upon the examination indicating receipt of an incorrect frame of packetized data by the second terminal.

8. The method of claim 7, wherein the history information includes bits corresponding to frames, with inverted bits indicating receipt of a correct frame of packetized data and wherein a received incorrect frame of packetized data is identified and subsequently retransmitted based upon a non-inverted bit in the history information.

9. A method comprising:

receiving a frame of packetized data from a first terminal, at a second terminal;

updating history information of the frame of packetized data, indicative of correctly received frames of packetized data, upon receiving a correct transmitted frame of packetized data;

transmitting a response back to the first terminal including the updated history information upon receiving a correct transmitted frame of packetized data; and transmitting a response back to the first terminal including non-updated history information upon the second terminal failing to receive a correct transmitted frame of packetized data.

10. The method of claim 9, wherein updated history information includes a frame number of a received correct frame added to existing history information.

11. The method of claim 9, comprising:

receiving a retransmission of a previously transmitted frame of packetized data in response to transmitting a response to the first terminal including non-updated history information.

12. The method of claim 11, wherein the history information includes bits corresponding to frames, with inverted bits indicating receipt of a correct frame of packetized data and wherein a received incorrect frame of packetized data is identified and subsequently retransmitted based upon a non-inverted bit in the history information.

* * * * *